(12) United States Patent
Nagasaka et al.

(10) Patent No.: US 11,286,579 B2
(45) Date of Patent: Mar. 29, 2022

(54) FIBER PRODUCTION METHOD AND CARBON FIBER PRODUCTION METHOD

(71) Applicant: Toray Industries, Inc., Tokyo (JP)

(72) Inventors: Takuya Nagasaka, Ehime (JP); Keiichi Ishio, Ehime (JP); Fumiya Yano, Ehime (JP); Naoyuki Furukawa, Otsu (JP); Seiji Nagano, Otsu (JP); Yuma Matsubara, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 308 days.

(21) Appl. No.: 16/495,965

(22) PCT Filed: Mar. 2, 2018

(86) PCT No.: PCT/JP2018/007933
§ 371 (c)(1),
(2) Date: Sep. 20, 2019

(87) PCT Pub. No.: WO2018/180188
PCT Pub. Date: Oct. 4, 2018

(65) Prior Publication Data
US 2020/0141028 A1    May 7, 2020

(30) Foreign Application Priority Data
Mar. 27, 2017  (JP) .............................. JP2017-060427

(51) Int. Cl.
*D01F 6/38* (2006.01)
*D01F 9/22* (2006.01)
(Continued)

(52) U.S. Cl.
CPC ................. *D01D 5/06* (2013.01); *D01F 6/18* (2013.01); *C01B 32/00* (2017.08); *C01B 32/05* (2017.08); *D10B 2321/10* (2013.01)

(58) Field of Classification Search
CPC .......... C01B 32/00; C01B 32/05; D01D 5/06; D01F 6/18; D01F 6/38; D01F 9/22; D10B 2321/10
(Continued)

(56) References Cited

U.S. PATENT DOCUMENTS 4,234,312 A * 11/1980 Paoletti .................. D06B 15/00
                                                    264/198
5,639,484 A    6/1997 White et al.

FOREIGN PATENT DOCUMENTS

CN    105839228 A  *  8/2016  ............... D01F 9/22
JP    0544104 A       2/1993
(Continued)

OTHER PUBLICATIONS

Translation of CN 105839228 A (published on Aug. 10, 2016).*
(Continued)

*Primary Examiner* — Leo B Tentoni
(74) *Attorney, Agent, or Firm* — RatnerPrestia

(57) ABSTRACT

A method of producing a fiber is provided, the method including extruding, from a spinneret, a spinning dope solution containing a fiber-forming polymer dissolved in a solvent, once allowing the solution to run in air, and then guiding the solution into the liquid of a coagulation bath to allow coagulation, wherein a gas-phase portion formed in a vertically downward direction from an extrusion surface of the spinneret to the liquid surface of the coagulation bath has a unidirectional air flow, and has an air flow rate per unit time (Af) which satisfies, in relation to the amount of the solvent in the spinning dope solution per unit time (As) in the gas-phase-portion volume (Vh), the relational expression $0.0008 \text{ m}^3 \leq \text{Af}/(\text{As}/\text{Vh}) \leq 0.0015 \text{ m}^3$. A method of producing a fiber, which, in dry-jet wet spinning, suppresses occurrence of dew condensation in the spinneret, and reduces deterioration of the appearance caused by winding on rollers (Continued)

in the subsequent process or by fuzzing or yarn break in the stretching process, to enable significant improvement of the productivity and the appearance as a whole, is provided.

3 Claims, 1 Drawing Sheet

(51) Int. Cl.
*D01D 5/06* (2006.01)
*D01F 6/18* (2006.01)
*C01B 32/00* (2017.01)
*C01B 32/05* (2017.01)

(58) Field of Classification Search
USPC .......... 264/29.2, 29.6, 178 F, 182, 184, 203, 264/331.16; 423/447.1, 447.6, 447.7
See application file for complete search history.

(56) References Cited

FOREIGN PATENT DOCUMENTS

| | | |
|---|---|---|
| JP | 08510516 A | 11/1996 |
| JP | 2007119973 A | 5/2007 |
| JP | 2007239170 A | 9/2007 |
| JP | 2010236139 A | 10/2010 |
| WO | 03014436 A1 | 2/2003 |

OTHER PUBLICATIONS

International Search Report and Written Opinion for International Application No. PCT/JP2018/007933 dated May 22, 2018. 6 pages.

\* cited by examiner

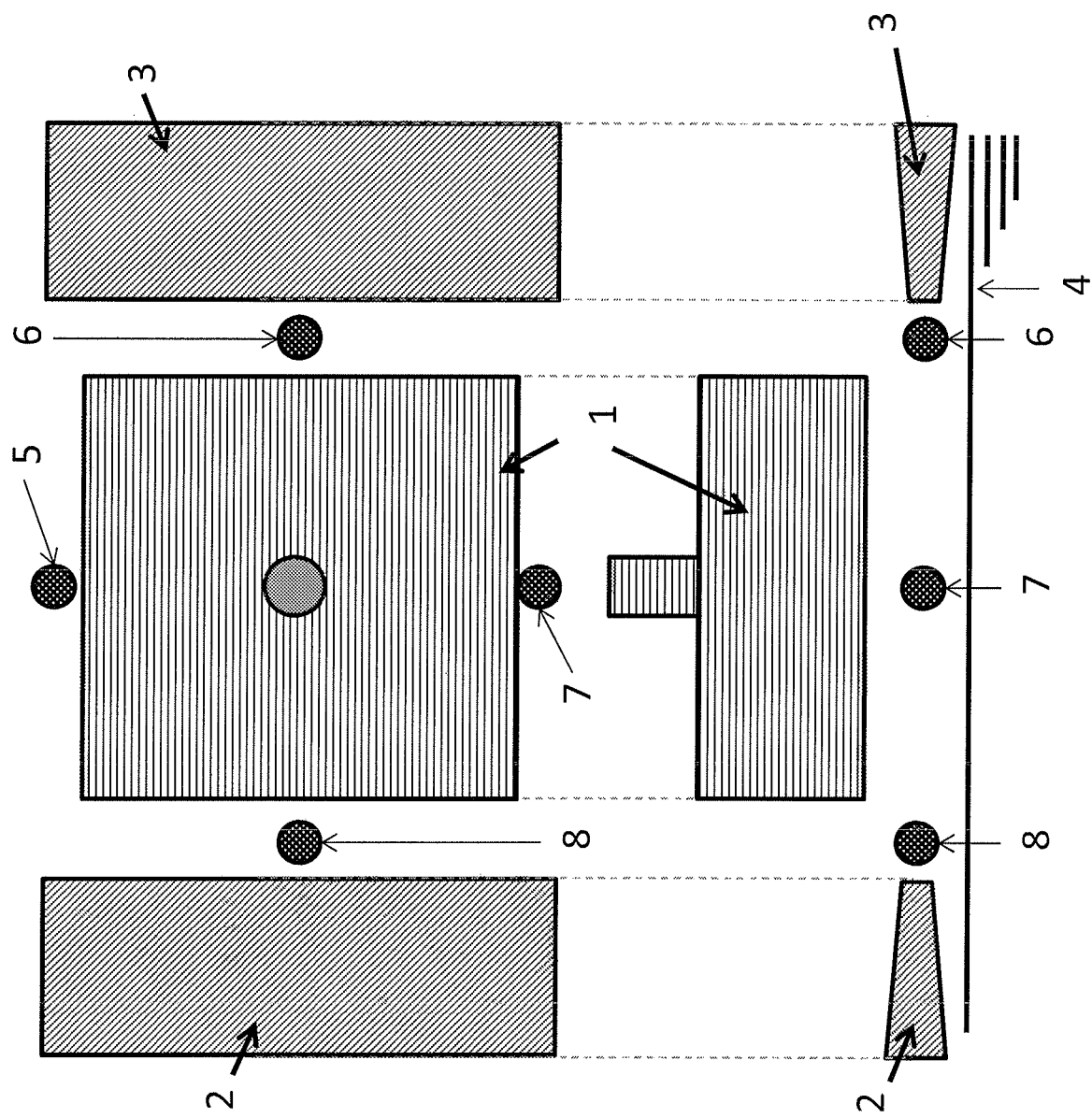

FIBER PRODUCTION METHOD AND CARBON FIBER PRODUCTION METHOD

CROSS REFERENCE TO RELATED APPLICATIONS

This is the U.S. National Phase application of PCT/JP2018/007933, filed Mar. 2, 2018, which claims priority to Japanese Patent Application No. 2017-060427, filed Mar. 27, 2017, the disclosures of these applications being incorporated herein by reference in their entirety for all purposes.

FIELD OF THE INVENTION

The present invention relates to a method of producing a fiber, which method enables production of a fiber by the dry-jet wet spinning method without causing dew condensation or generation of water droplets on the spinneret surface, and with remarkable stability of running of fibers.

BACKGROUND OF THE INVENTION

For production of a fiber by spinning of a fiber-forming polymer which hardly melts, such as a polyacrylonitrile, the wet spinning method or the dry-jet wet spinning method is employed. The dry-jet wet spinning method is a method in which a spinning dope solution containing a fiber-forming polymer dissolved in a solvent is extruded from a spinneret, and then once allowed to run in air, immediately followed by being guided into a coagulation bath liquid to allow coagulation. Unlike the wet spinning method, this method has less draft restriction in a gas, where the bath-liquid resistance is absent. Therefore, high-speed or high-draft spinning is possible, and the method is used for production of fibers for clothing and industrial uses. Further, since the dry-jet wet spinning method enables higher densification of fibers, the method has recently been utilized for production of precursor fibers for high strength/high modulus carbon fibers, and the productivity in the dry-jet wet spinning method has been enhanced by performing high-speed spinning or increasing the holes in the spinneret.

In the dry-jet wet spinning method, since a spinning dope solution is extruded from a spinneret arranged outside a coagulation bath, a gas-phase portion is present between the spinneret surface and the coagulation bath. Therefore, when high-speed spinning is carried out, or when the number of holes in one spinneret is increased, that is, when the so-called hole multiplication is carried out, vapor of the solvent contained in the spinning dope solution increases in the gas-phase portion, and the vapor accumulates in the gas-phase portion, often leading to occurrence of dew condensation on the spinneret surface. The droplets generated by the dew condensation cause clogging of the extrusion hole of the spinneret, fiber adhesion, uneven fineness, and single-fiber break, and further, spinneret immersion due to contact of the droplets with the coagulation liquid surface, leading to winding on rollers in the subsequent process and fuzzing or yarn break in the stretching process. Thus, the operability and the appearance are significantly deteriorated. Such problems become more serious especially when high-speed spinning is carried out, or when the number of holes in the spinneret is increased, in order to increase the productivity.

PATENT DOCUMENTS

For the purpose of reducing such problems, a method for preventing dew condensation in dry-jet wet spinning, wherein a gas is allowed to flow, from one direction, in the gas-phase portion of the spinneret surface and the coagulation bath, has been proposed (Patent Document 1).

Further, also for multi-hole spinnerets with more than 2000 holes, a method for preventing accumulation of the solvent vapor, wherein the gas in the gas-phase portion formed between the extrusion surface of the spinneret and the coagulation bath is sucked alternately from two directions sandwiching the extrusion surface, has been studied (Patent Document 2).

Further, a method for controlling the temperature and the humidity in the vicinity of the spinneret to suppress dew condensation on the spinneret surface, wherein the inside of the coagulation chamber is surrounded, and wherein air with a controlled temperature and humidity is circulated therein, has also been studied (Patent Document 3).

[Patent Document 1] JP 5-044104 A
[Patent Document 2] JP 2007-239170 A
[Patent Document 3] JP 2010-236139 A

SUMMARY OF THE INVENTION

When the number of holes used in the spinneret is as small as, for example, about 300, the technique proposed in Patent Document 1 may be able to effectively suppress dew condensation in some cases. However, under conditions where the number of holes is not less than 2000, where the hole density is increased, or where the gas-phase portion in dry-jet wet spinning has a height of less than 20 mm in the vertically downward direction from the extrusion surface of the spinneret to the coagulation bath liquid surface, that is, under conditions where the solvent vapor easily accumulates in the gas-phase portion, deflection of the air flow occurs even by application of the technique proposed in Patent Document 1, causing accumulation of the vapor in some cases. This has been problematic since the dew condensation cannot be prevented.

Regarding Patent Document 2, there are problems in that, when the hole density is high, insufficiency of suction in the gas-phase portion causes aggregation of the solvent vapor, and that the aggregation proceeds on surfaces not subjected to the exhaustion, causing dew condensation.

Regarding Patent Document 3, although the controlled air is introduced into the extrusion hole in the spinneret outer layer portion, the controlled air does not reach the inside of the spinneret, so that the dew condensation-suppressing effect has been insufficient. Further, since the control of the temperature and the humidity is carried out by entirely surrounding the inside of the coagulation chamber, the method requires larger-scale equipment and a higher equipment cost, so that practical application of the method has been substantially difficult.

An object of the present invention is to provide a method of producing a fiber, which method suppresses occurrence of dew condensation on the spinneret, and reduces deterioration of the appearance caused by winding on rollers in the subsequent process or by fuzzing or yarn break in the stretching process, to enable significant improvement of the productivity and the appearance as a whole even under conditions where, for example, not less than 2000 holes are present and the hole density is high, or where the gas-phase portion formed in the vertically downward direction from the extrusion surface of the spinneret to the coagulation bath liquid surface in dry-jet wet spinning has a height of less than 20 mm.

For solving the above problems, the method of producing a fiber of the present invention has the following constitution. That is, the method is a method of producing a fiber, comprising extruding, from a spinneret, a spinning dope solution containing a fiber-forming polymer dissolved in a solvent, once allowing the solution to run in air, and then guiding the solution into a coagulation bath liquid to allow coagulation, wherein a gas-phase portion formed in a vertically downward direction from an extrusion surface of the spinneret to a coagulation bath liquid surface has a unidirectional air flow, and has an air flow rate per unit time (Af) which satisfies, in relation to the amount of the solvent in the spinning dope solution per unit time (As) in the gas-phase-portion volume (Vh), the relational expression $0.0008$ $m^3 \leq Af/(As/Vh) \leq 0.0015$ $m^3$.

In the method of producing a fiber of the present invention, the relative standard deviation of the wind velocities at four points in the outer periphery of the spinneret in the gas-phase portion is preferably not more than 40%.

In the method of producing a fiber of the present invention, the hourly average of the absolute humidity at each of four points in the outer periphery of the spinneret in the gas-phase portion is preferably not more than 20 $g/m^3$.

In the method of producing a fiber of the present invention, the number of holes in the spinneret is preferably not less than 2000 and not more than 50,000.

In the method of producing a fiber of the present invention, the fiber-forming polymer is preferably an acrylonitrile copolymer.

The method of producing a carbon fiber of the present invention has the following constitution. That is, the method is a method of producing a carbon fiber, comprising producing a fiber using an acrylonitrile copolymer as a fiber-forming polymer by the above method of producing a fiber, performing stabilization treatment in an oxidizing gas at 200 to 300° C., and then heating the fiber in an inert gas at not less than 1000° C.

According to the present invention, occurrence of dew condensation on a spinneret can be suppressed, and deterioration of the appearance caused by winding on rollers in the subsequent process or by fuzzing or yarn break in the stretching process can be reduced, thereby enabling significant improvement of the productivity and the appearance as a whole even under conditions of dry-jet wet spinning where, for example, not less than 2000 holes are present and the hole density is high, or where the distance between the spinneret and the coagulation bath liquid is less than 20 mm. The present invention is especially suitable for production of acrylonitrile precursor fibers for carbon fibers.

BRIEF DESCRIPTION OF THE DRAWING

The FIGURE shows schematic top and front views of a spinning region in a case where an air supply nozzle and an exhaust nozzle are arranged in the present invention.

DETAILED DESCRIPTION OF EMBODIMENTS OF THE INVENTION

The present invention is described below in more detail.

The method of the present invention can be used for production of acrylonitrile fibers for clothing, acrylonitrile fibers for production of carbon fibers, aromatic polyamide fibers, and the like. The method shows the most remarkable effect in cases of production of acrylonitrile fibers for production of carbon fibers.

In the present invention, a spinning dope solution containing a fiber-forming polymer dissolved in a solvent is used. Examples of the fiber-forming polymer that may be used include acrylonitrile copolymers and aromatic polyamides. As a polymerization method for obtaining the polymer, solution polymerization, emulsion/suspension polymerization, bulk polymerization, or the like is used. Either a batch method or a continuous method may be used.

In cases of an acrylonitrile copolymer, examples of the solvent in which the polymer is dissolved include dimethylsulfoxide (DMSO), dimethylformamide (DMF), dimethylacetamide (DMAc), aqueous zinc chloride solutions ($ZnCl_2$ aq), and aqueous sodium thiocyanate solutions (NaSCN aq). From the viewpoint of productivity, DMSO, DMF, or DMAc is preferred in dry-jet wet spinning since these allow rapid coagulation of the polymer. DMSO is especially preferred since it allows especially rapid coagulation.

The spinning dope solution is extruded from an extrusion surface of a spinneret arranged above a coagulation bath through a gas-phase portion, and then the solution is allowed to coagulate in a coagulation bath, to form a fiber.

Regarding the temperature of the spinning dope solution and the temperature of the coagulation bath, their conditions are preferably set such that the difference between the atmospheric temperature and the dew point (atmospheric temperature−dew point) of the gas-phase portion formed in the vertically downward direction from the extrusion surface of the spinneret to the coagulation bath liquid surface is as large as possible.

Regarding the temperature of the spinning dope solution, a low temperature is preferred from the viewpoint of reducing the amount of evaporation of the solvent as long as the temperature is not less than the freezing point of the solvent used for the spinning dope solution. On the other hand, the temperature is preferably not more than the freezing point +20° C., further, not less than the freezing point +5° C., and not more than the freezing point +15° C. In cases where the temperature of the spinning dope solution is within this preferred temperature range, the spinning dope solution can have an appropriate viscosity, so that a favorable spinnability and an excellent operability can be achieved. As the coagulation bath, an aqueous solution of the same solvent as the solvent used for the spinning dope solution is usually used. Since dew condensation tends to occur especially in organic solvent systems, the effect of the present invention remarkably appears especially in cases where an aqueous solution of DMSO, DMF, or DMAc is used as the coagulation bath. In cases where the temperature of the coagulation bath is high, dew condensation tends to occur due to vapor of the bath liquid. Therefore, from the viewpoint of suppressing the occurrence of the dew condensation as much as possible, the temperature of the coagulation bath is preferably not more than 20° C., more preferably not more than 10° C., still more preferably not more than 7° C. On the other hand, the temperature of the coagulation bath is preferably not less than 0° C., more preferably not less than 1° C. In cases where the temperature of the coagulation bath is within this preferred temperature range, a favorable spinnability and an excellent operability can be achieved.

The number of holes in the spinneret is preferably 2000 to 50,000, more preferably 4000 to 20,000. In cases where the number of holes is within this preferred range, a high productivity can be achieved. Moreover, since the mass of the spinneret does not increase excessively, workability can be secured, and the equipment cost can be suppressed. In cases where, for example, the spinneret area occupied by each hole (spinneret area÷number of holes) is 5 $mm^2$ to 10 $mm^2$, the effect of the present invention can be more easily produced.

In the present invention, it is important to provide a unidirectional air flow in the gas-phase portion formed between the extrusion surface of the spinneret and the coagulation bath liquid surface, and to perform blowing at an air flow rate per unit time (Af) of 0.0008 m$^3$ to 0.0015 m$^3$ with respect to the amount of the solvent in the extruded dope solution per unit time (As) in the gas-phase-portion volume (Vh). Further, the relative standard deviation of the wind velocities at four points in the outer periphery of the spinneret is preferably not more than 40%, and the hourly average of the absolute humidity at each of four points in the outer periphery of the spinneret is preferably not more than 20 g/m$^3$. Examples of methods therefor include a method in which an air conditioner capable of controlling the humidity of the supplied air is arranged at a position distant from the spinneret, and air is blown into the gas-phase portion at a certain air flow rate, and a method in which an air supply nozzle or an exhaust nozzle is arranged. In the present invention, Af/(As/Vh) is 0.0008 m$^3$ to 0.0015 m$^3$, preferably 0.0009 m$^3$ to 0.0014 m$^3$, more preferably 0.0010 m$^3$ to 0.0013 m$^3$. In cases where Af/(As/Vh) exceeds 0.0015 m$^3$, the coagulation bath liquid surface fluctuates, leading to instability of the spinning performance, so that the effect may be insufficient. In cases where Af/(As/Vh) is less than 0.0008 m$^3$, the air flow rate is insufficient relative to the amount of the solvent, so that the suppression of dew condensation on the extrusion surface of the spinneret is insufficient, which is problematic. It is preferred to perform scavenging without variation of the wind velocity among the four points in the outer periphery of the spinneret. The relative standard deviation of the wind velocities at the four points in the outer periphery of the spinneret is preferably not more than 40%, more preferably not more than 20%, still more preferably not more than 10%. Further, the hourly average of the absolute humidity at each of the four points in the outer periphery of the spinneret is preferably not more than 20 g/m$^3$, more preferably not more than 15 g/m$^3$, still more preferably not more than 10 g/m$^3$. Within these ranges, occurrence of dew condensation on the extrusion surface of the spinneret can be suppressed, so that the effect can be produced irrespective of the shape of the spinneret, that is, irrespective of whether it is circular, rectangular, or the like.

Here, the air flow rate per unit time (Af) is calculated from, among the wind velocities measured at the four measurement points in the outer periphery of the spinneret, the wind velocity at one point positioned in the upstream side of the air flow, and the cross-sectional area as determined by seeing the spinneret from the upstream side of the air flow. The gas-phase-portion volume (Vh) is calculated from the extrusion area calculated from the outermost extrusion holes of the spinneret, and the height of the gas-phase portion formed in the vertically downward direction from the extrusion surface to the coagulation bath liquid surface. The amount of the solvent in the extruded dope solution (As) is the amount of the solvent contained in the dope solution extruded from the spinneret per unit time.

As shown in the FIGURE, the wind velocities, the air flow directions, and the absolute humidities at the four points in the outer periphery of the spinneret are measured at positions arranged such that the outer periphery of the spinneret is equally divided into four portions, and such that each position is at the middle point of the height from the liquid surface to the spinneret surface, and 30 mm distant from the outermost extrusion holes of the spinneret, irrespective of the shape of the spinneret. Here, regarding the four points in the outer periphery of the spinneret, in cases where the spinneret has a circular shape, arbitrary four points on the circumference may be selected such that the outer circumference is equally divided into four portions. In cases where the spinneret has a rectangular shape, the four midpoints of the segments constituting the outer periphery may be selected. The wind velocity and the absolute humidity are measured using Climomaster MODEL 6501 (Kanomax Japan Inc.). The absolute humidity (AH) [g/m$^3$] is calculated from the temperature (T) [° C.] and the relative humidity (RH) [%] measured with the Climomaster, using the following calculation equation. (e: saturated vapor pressure [hPa])

$$e=6.11\times10^{(7.5T/(T+237.3))}$$

$$AH=217\times e/(T+273.15)\times RH/100$$

Here, the hourly average of the absolute humidity at each of four points in the outer periphery of the spinneret is obtained by measuring the wind velocity, the temperature, and the relative humidity as described above 12 times at 5-minute intervals, calculating the absolute humidities using the above calculation equation, and then calculating their average for each measurement point.

For the air flow direction, a Smoke Tester Set No. 500 (Gastec Corporation) was used. The tips of smoke tubes were placed at the measurement points described above, and the flow of smoke was observed from directly above each measurement point. The direction in which the yarn is taken from the coagulation bath is used as a reference direction. In cases where the difference between the angle at the point with the largest clockwise angle of the air flow direction and the angle of the air flow direction at each of all three remaining points is not more than 30°, the air flow is judged as a unidirectional flow. In cases where at least one point shows a difference of more than 30°, the air flow is judged as a scattering flow.

Further, in cases where an air supply or exhaust nozzle is used for supplying or exhausting a gas, the direction of the nozzle is preferably set such that the nozzle outlet is arranged in the spinneret direction, and in parallel to the coagulation bath liquid surface as shown in the FIGURE. More specifically, the nozzle is arranged such that it is inclined at an angle of preferably 60° to 100°, more preferably 90° from the vertically downward direction (defined as 0°) toward the spinneret direction. The FIGURE shows a case where each nozzle is arranged at an angle of 90°. In cases where the nozzle is arranged such that it is inclined at an angle (nozzle angle) of not more than 100°, vapor generated from the solvent can be efficiently scavenged, and adhesion of dewdrops on the spinneret surface can be suppressed. On the other hand, in cases where the nozzle is inclined at not less than 60°, either the air supply nozzle or the exhaust nozzle is less likely to cause fluctuation of the coagulation bath liquid surface, so that spinneret immersion due to contact of the liquid surface with the spinneret is less likely to occur, and adhesion between single fibers and the like can be effectively prevented. Thus, the appearance of the fibers can be maintained, and an excellent process stability can be achieved. In cases of an exhaust nozzle, vapor generated from the solvent is sucked while it is in contact with the spinneret surface. Therefore, growth of dewdrops may be promoted and enhanced, leading to early deterioration of the productivity and the appearance in some cases.

The present invention is especially effective for production of an acrylonitrile fiber, especially an acrylonitrile fiber as a carbon fiber precursor, using an acrylonitrile copolymer. Details of the conditions specific to such cases are described below in detail.

The spinning dope solution used for the dry-jet wet spinning is preferably a solution containing: an acrylonitrile copolymer containing acrylonitrile at not less than 90% by mass and less than 100%; and a vinyl monomer copolymerizable therewith; dissolved in the solution. In cases where the amount of the acrylonitrile used in the acrylonitrile copolymer is within the preferred range described above, carbon fibers obtained by carbonization of the resulting acrylonitrile fibers have high strength, and therefore carbon fibers having excellent mechanical properties can be easily produced. Moreover, since the content of the solvent does not become excessive, dew condensation is less likely to be caused in the gas-phase portion between the spinneret and the coagulation bath liquid in dry-jet wet spinning. On the other hand, in cases where the amount of the acrylonitrile used in the acrylonitrile copolymer is 100%, while the amount of the solvent vapor is small, an increase in the viscosity and promotion of gelation proceed during polymerization of the acrylonitrile copolymer. Therefore, in dry-jet wet spinning, clogging of the extrusion hole of the spinneret, fiber adhesion, uneven fineness, and single-fiber break may occur, leading to winding on rollers in the subsequent process, and fuzzing or yarn break in the stretching process. Thus, the operability and the appearance may be significantly deteriorated as a result.

The present invention can be preferably applied to cases where fiber bundles each having a filament number of usually within the range of 2000 to 50,000, and a single fiber fineness of usually within the range of 0.5 dtex to 3 dtex, are obtained. The fiber bundle after fiber formation in the coagulation bath may be stretched directly in a stretching bath, or stretching in a bath may be carried out after removal of the solvent by washing with water.

Usually, after the stretching in the bath, an oil agent is applied, and drying with a hot roller or the like is carried out. Further, when necessary, this is followed by stretching such as steam stretching, to obtain a fiber bundle.

The following is a description of a method of producing a carbon fiber from a fiber obtained by the method of producing a fiber wherein the fiber-forming polymer is an acrylonitrile copolymer.

An acrylonitrile fiber produced by the method of producing an acrylonitrile fiber is subjected to stabilization treatment in an oxidizing gas such as air at 200 to 300° C. From the viewpoint of obtaining a stabilized fiber, the processing temperature is preferably increased from a low temperature to a high temperature in a plurality of steps. Further, from the viewpoint of allowing sufficient exertion of the performance of the carbon fiber, the fiber is preferably stretched at a high stretch ratio as long as fuzzing does not occur. Subsequently, the resulting stabilized fiber is heated at not less than 1000° C. in an inert gas such as nitrogen, to produce a carbon fiber. Thereafter, by performing anodic oxidation in an aqueous electrolyte solution, addition of a functional group(s) to the carbon fiber surface becomes possible, so that adhesiveness to resins can be improved. Further, it is preferred to add a sizing agent such as an epoxy resin to obtain a carbon fiber having excellent abrasion resistance.

EXAMPLES

The present invention is described below more concretely by way of Examples. As shown in the FIGURE, the wind velocities, the air flow directions, and the absolute humidities at the four points in the outer periphery of the spinneret used in the present Examples were measured at the four midpoints of the segments constituting the outer periphery of the spinneret having a rectangular shape, wherein each point was positioned at the middle point of the height from the liquid surface to the spinneret surface, and 30 mm distant from the outermost extrusion holes of the spinneret. The wind velocity, the temperature, and the relative humidity were measured using Climomaster MODEL 6501 (Kanomax Japan Inc.). The absolute humidity (AH) [g/m$^3$] was calculated from the temperature (T) [° C.] and the relative humidity (RH) [%] measured with the Climomaster, using the following calculation equation. (e: saturated vapor pressure [hPa])

$$e=6.11\times10^{(7.5T/(T+237.3))}$$

$$AH=217\times e/(t+273.15)\times RH/100$$

Here, the hourly average of the absolute humidity at each of the four points in the outer periphery of the spinneret was obtained by measuring the wind velocity, the temperature, and the relative humidity as described above 12 times at 5-minute intervals, calculating the absolute humidities using the above calculation equation, and then calculating their average for each measurement point.

For the air flow direction, a Smoke Tester Set No. 500 (Gastec Corporation) was used. The tips of smoke tubes were placed at the measurement points described above, and the flow of smoke was observed from directly above each measurement point. The direction in which the yarn was taken from the coagulation bath was used as a reference direction. In cases where the difference between the angle at the point with the largest clockwise angle of the air flow direction and the angle of the air flow direction at each of all three remaining points was not more than 30°, the air flow was judged as a unidirectional flow. In cases where at least one point showed a difference of more than 30°, the air flow was judged as a scattering flow.

The air flow rate per unit time (Af) was calculated from, among the wind velocities measured at the four measurement points, the wind velocity at one point positioned in the upstream side of the air flow, and the cross-sectional area as determined by seeing the spinneret from the upstream side of the air flow. The gas-phase-portion volume (Vh) was calculated from the extrusion area calculated from the outermost extrusion holes of the spinneret, and the height of the gas-phase portion formed in the vertically downward direction from the extrusion surface to the coagulation bath liquid surface. The amount of the solvent in the extruded dope solution (As) is the amount of the solvent contained in the dope solution extruded from the spinneret per unit time.

The degree of dew condensation on the spinneret surface, the appearance of the acrylonitrile fiber bundle, and the process stability were judged as follows.

(Degree of Dew Condensation on Spinneret Surface)

The sizes and the number of dewdrops on the spinneret surface were measured after one week of continuous spinning, and scored according to the following standard.

Dewdrop diameter, less than 2 mm: 1 point/dewdrop

Dewdrop diameter, not less than 2 mm and less than 5 mm: 5 points/dewdrop

Dewdrop diameter, not less than 5 mm: 10 points/dewdrop (Appearance of Acrylonitrile Fiber Bundle)

Before taking the acrylonitrile fiber bundle, the fuzz number in the acrylonitrile fiber was counted for a length of 1000 m to evaluate the appearance. The evaluation standard was as follows.

1: (Fuzz number/fiber bundle·1000 m)≤1
2: 1<(Fuzz number/fiber bundle·1000 m)≤2
3: 2<(Fuzz number/fiber bundle·1000 m)≤5
4: 5<(Fuzz number/fiber bundle·1000 m)<60
5: 60≤(Fuzz number/fiber bundle·1000 m)

(Process Stability of Acrylonitrile Fiber Bundle)

Evaluation was carried out based on the yarn break frequency during production of 10 t of acrylonitrile fiber bundles. The evaluation standard was as follows.

1: (Yarn break frequency/production of 10 t of acrylonitrile fiber bundles)≤1
2: 1<(Yarn break frequency/production of 10 t of acrylonitrile fiber bundles)≤2
3: 2<(Yarn break frequency/production of 10 t of acrylonitrile fiber bundles)≤3
4: 3<(Yarn break frequency/production of 10 t of acrylonitrile fiber bundles)<5
5: 5≤(Yarn break frequency/production of 10 t of acrylonitrile fiber bundles)

Examples 1 to 4

A solution of an acrylonitrile copolymer composed of 99% by mass acrylonitrile and 1% by mass itaconic acid in DMSO was prepared by solution polymerization.

Using a spinneret whose total number of dope solution extrusion holes is 6000, the resulting acrylonitrile copolymer solution (spinning dope solution) was extruded once into air from the extrusion surface of the spinneret to allow the solution to pass through the gas-phase portion, and then extruded into a coagulation bath liquid composed of 35% by mass DMSO/65% by mass water, to obtain a coagulated fiber.

Here, for the spinning, an air supply nozzle and an exhaust nozzle in each of which an aperture of 5 mm×200 mm is formed were arranged such that the spinneret was sandwiched between these. By blowing air with a controlled humidity from the air supply nozzle, and sucking the air with the exhaust nozzle, a unidirectional flow was formed to scavenge the solvent vapor generated in the gas-phase portion between the extrusion surface and the coagulation bath. The nozzle angle of the air supply/exhaust nozzles, Af/(As/Vh), and the relative standard deviation of the wind velocities at the four measurement points, were changed among the Examples as shown in Table 1. Table 1 also shows the degree of dew condensation on the extrusion surface, the appearance of the acrylonitrile fiber bundle, and the process stability in each Example.

The resulting coagulated fiber was then washed with water, and an oil agent was applied thereto while performing stretching in a bath stretching process, followed by performing drying and a stretching process. By this, an acrylonitrile fiber bundle with 6000 single fibers could be stably produced.

TABLE 1

|  |  | Example 1 | Example 2 | Example 3 | Example 4 | Example 5 | Example 6 | Example 7 |
|---|---|---|---|---|---|---|---|---|
| Af/(As/Vh) | m³ | 0.0013 | 0.0008 | 0.0014 | 0.0011 | 0.0012 | 0.0009 | 0.0013 |
| Nozzle angle | ° | 90 | 60 | 100 | 90 | 90 | 90 | 90 |
| Rerative standard deviation of wind velocities at four measurement points | % | 10 | 30 | 28 | 55 | 23 | 50 | 12 |
| Air flow direction of four measurement points | — | One direction flow | One direction flow | One direction flow | One direction flow | One direction flow | One direction flow | One direction flow |
| Absolute humidity at measurement point A 1 hr average | g/m³ | 12.8 | 14.8 | 15.3 | 17.3 | 22.2 | 21.2 | 10.2 |
| Absolute humidity at measurement point B 1 hr average | g/m³ | 15.7 | 19.8 | 19.6 | 19.7 | 23.3 | 24.4 | 19.2 |
| Absolute humidity at measurement point C 1 hr average | g/m³ | 11.9 | 17.1 | 13.8 | 17.5 | 21.1 | 20.1 | 10.4 |
| Absolute humidity at measurement point D 1 hr average | g/m³ | 12.5 | 14.1 | 13.4 | 13.2 | 19.2 | 20.7 | 9.1 |
| Dew condensation numbers on extrusion surface | Front surface of spinneret numbers | 1 | 1 | 1 | 0 | 4 | 4 | 0 |
|  | Back surface of spinneret numbers | 0 | 2 | 1 | 2 | 2 | 6 | 0 |
|  | Side surface of spinneret numbers | 1 | 0 | 1 | 2 | 3 | 4 | 1 |
| Appearance during production of acrylonitrile fiber bundle | — | 1 | 2 | 1 | 2 | 2 | 2 | 1 |
| Yarn breakge frequency during production of acrylonitrile fiber bundle | — | 1 | 1 | 2 | 2 | 2 | 2 | 1 |

TABLE 1-continued

| | | Example 8 | Example 9 | Comparative Example 1 | Comparative Example 2 | Comparative Example 3 | Comparative Example 4 |
|---|---|---|---|---|---|---|---|
| Af/(As/Vh) | $m^3$ | 0.0013 | 0.0010 | 0.0002 | 0.0500 | 0.0200 | 0.0010 |
| Nozzle angle | ° | 90 | 90 | — | 90 | 90 | 120 |
| Rerative standard deviation of wind velocities at four measurement points | % | 30 | 40 | 10 | 23 | 35 | 30 |
| Air flow direction of four measurement points | — | One direction flow | One direction flow | One direction flow | One direction flow | Scattered flow | Scattered flow |
| Absolute humidity at measurement point A 1 hr average | $g/m^3$ | 14.2 | 12.5 | 24.5 | 17.3 | 12.5 | 11.4 |
| Absolute humidity at measurement point B 1 hr average | $g/m^3$ | 17.3 | 16.8 | 24.9 | 18.7 | 19.1 | 18.5 |
| Absolute humidity at measurement point C 1 hr average | $g/m^3$ | 12.8 | 19.8 | 24.6 | 14.8 | 10.5 | 15.2 |
| Absolute humidity at measurement point D 1 hr average | $g/m^3$ | 13.4 | 13.6 | 24.2 | 11.2 | 13.1 | 12.8 |
| Dew condensation numbers on extrusion surface | Front surface of spinneret, numbers | 0 | 0 | 102 | 0 | 89 | 3 |
| | Back surface of spinneret, numbers | 1 | 2 | 60 | 1 | 86 | 40 |
| | Side surface of spinneret, numbers | 1 | 1 | 0 | 5 | 30 | 32 |
| Appearance during production of acrylonitrile fiber bundle | — | 2 | 1 | 5 | 4 | 4 | 2 |
| Yarn breakge frequency during production of acrylonitrile fiber bundle | — | 1 | 2 | 3 | 5 | 2 | 4 |

Examples 5 and 6

Acrylonitrile precursor fibers were obtained in the same manner as in Examples 1 to 4 except that Af/(As/Vh) was changed as shown in Table 1, and that high-humidity air was blown.

Example 7

An acrylonitrile precursor fiber was obtained in the same manner as in Examples 1 to 4 except that Af/(As/Vh) was changed as shown in Table 1, and that low-humidity air was blown.

Example 8

An acrylonitrile precursor fiber was obtained in the same manner as in Examples 1 to 4 except that Af/(As/Vh) was changed as shown in Table 1, and that a 9000-hole spinneret was used.

Example 9

An acrylonitrile precursor fiber was obtained in the same manner as in Examples 1 to 4 except that Af/(As/Vh) was changed as shown in Table 1, and that a 2000-hole spinneret was used.

Comparative Example 1

An acrylonitrile precursor fiber was obtained in the same manner as in Examples 1 to 4 except that Af/(As/Vh) was changed as shown in Table 1, and that the air supply/exhaust nozzles were not operated.

Comparative Examples 2 and 3

Acrylonitrile precursor fibers were obtained in the same manner as in Examples 1 to 4 except that Af/(As/Vh) was changed as shown in Table 1.

Comparative Example 4

An acrylonitrile precursor fibers was obtained in the same manner as in Examples 1 to 4 except that Af/(As/Vh) was changed as shown in Table 1, and that the nozzle angle was changed.

Table 1 also shows the degree of dew condensation on the extrusion surface, the appearance of the acrylonitrile fiber bundle, and the process stability in each of the Examples and the Comparative Examples.

As shown in Table 1, it can be seen that dew condensation on the extrusion surface of the spinneret was suppressed, and the appearance and the process stability were improved by the present invention.

INDUSTRIAL APPLICABILITY

The present invention can be practically used not only for suppressing occurrence of dew condensation on the spinneret surface in production of precursor fiber bundles for carbon fibers, but also as means for improving productivity by suppression of dew condensation in any dry-jet wet spinning.

DESCRIPTION OF SYMBOLS

1. Spinneret
2. Air supply nozzle
3. Exhaust nozzle

4. Coagulation bath
5. Wind velocity/absolute humidity/air flow measurement point A
6. Wind velocity/absolute humidity/air flow measurement point B
7. Wind velocity/absolute humidity/air flow measurement point C
8. Wind velocity/absolute humidity/air flow measurement point D

The invention claimed is:

1. A method of producing a fiber, the method comprising extruding, from a spinneret, a spinning dope solution containing an acrylonitrile copolymer dissolved in a solvent, once allowing the solution to run in air, and then guiding the solution into a coagulation bath liquid to allow coagulation,
    wherein a number of holes in the spinneret is not less than 2000 and not more than 50,000,
    a gas-phase portion formed in a vertically downward direction from an extrusion surface of the spinneret to a coagulation bath liquid surface has a unidirectional air flow,
    a relative standard deviation of the wind velocities at four points in an outer periphery of the spinneret in the gas-phase portion is not more than 40%,
    and has an air flow rate per unit time (Af) which satisfies, in relation to the amount of the solvent in the spinning dope solution per unit time (As) in the gas-phase-portion volume (Vh), the relational expression $0.0008\ m^3 \leq Af/(As/Vh) \leq 0.0015\ m^3$.

2. The method of producing a fiber according to claim 1, wherein an hourly average of an absolute humidity at each of four points in an outer periphery of the spinneret in the gas-phase portion is not more than 20 g/m$^3$.

3. A method of producing a carbon fiber, comprising producing a fiber by the method of producing a fiber according to claim 1, performing stabilization treatment in an oxidizing gas at 200 to 300° C., and then heating the fiber in an inert gas at not less than 1000° C.

* * * * *